US00RE43563E

(19) United States
(12) Reissued Patent
Hendrickson et al.

(10) Patent Number: US RE43,563 E
(45) **Date of Reissued Patent: *Aug. 7, 2012**

(54) BELLY COVERING GARMENT

(75) Inventors: Lisa A. Hendrickson, Mount Laurel, NJ (US); James H. Gardner, III, Ambler, PA (US); Richard Adelman, Greensboro, NC (US)

(73) Assignee: Destination Maternity Corporation, Philadelphia, PA (US)

( * ) Notice: This patent is subject to a terminal disclaimer.

(21) Appl. No.: 13/161,169

(22) Filed: Jun. 15, 2011

Related U.S. Patent Documents

Reissue of:
(64) Patent No.: 7,900,276
Issued: Mar. 8, 2011
Appl. No.: 12/117,004
Filed: May 8, 2008

U.S. Applications:
(63) Continuation of application No. 11/756,242, filed on May 31, 2007, now Pat. No. 7,814,575.

(51) Int. Cl.
*A41D 1/06* (2006.01)
*A41D 13/00* (2006.01)

(52) U.S. Cl. ..... 2/237; 2/236; 2/227

(58) Field of Classification Search ..... 2/227, 228, 2/236–238, 69, 243.1; 450/96–100, 155
See application file for complete search history.

(56) References Cited

U.S. PATENT DOCUMENTS 3,045,676 A 7/1962 Slaten
3,045,678 A * 7/1962 Geimer ..... 450/130
4,280,229 A * 7/1981 Stein ..... 2/221
4,506,390 A * 3/1985 Stern ..... 2/221
5,946,730 A * 9/1999 Blair ..... 2/227
6,311,333 B1 * 11/2001 Batra ..... 2/237
7,814,575 B2 10/2010 Hendrickson et al.
7,900,276 B2 3/2011 Hendrickson et al.
2004/0210987 A1 * 10/2004 Carney ..... 2/236
2006/0010571 A1 * 1/2006 Oakley ..... 2/227

OTHER PUBLICATIONS

"BOM Spring 2006"—Sketch and measurements of Gap Full Panel Long and Lean pant, Style # 376586, Gap Maternity Denim, Spring 2006.

"BOM Fall 2003"—Sketch and measurements of Old Navy Bootcut Jean w/Panel Non-Stretch pant, Style # 200963-00, Old Navy Women's Maternity, Fall 2003.

"BOM Fall 2005"—Sketch and measurement of Gap Roll Panel Modern Chino pant, Style # 313773, Gap Maternity Wovens, Fall 2005.

"Garment Diagrams"—Sketches and measurements of various Gap and Old Navy garments, Style Nos. 324282, 256229, 281008, 205224Su05, Fall 2004-Summer 2005.

(Continued)

*Primary Examiner* — Gloria Hale
(74) *Attorney, Agent, or Firm* — DLA Piper LLP (US)

(57) ABSTRACT

The present invention relates to a garment worn during different stages of pregnancy and different stages of postpartum body changes. A garment upper portion has a belly panel that is expansible to cover and fit over a growing abdomen during different stages of pregnancy, and a garment lower portion having a first torso encircling circumference that recedes downward to make way for expansion of the belly panel. The garment upper portion has a second torso encircling circumference to hold the garment up and in place over the torso.

21 Claims, 8 Drawing Sheets

OTHER PUBLICATIONS

"Poplin Pant" et al.—Maternity Print Str. Crisp Ctn. Poplin pant, Style # MBT414A (Ultra Clean Ankle Overbelly), Aug. 9, 2002.
"Jean Pant" et al.—GAP Women's Full Panel Bootcut Jean, Style # 207095, Apr. 30, 2003.
"Artifact color"—*Selected pages from the JCPenney Catalog Maternity Collection*, published IQ 2004, front and back cover pages, and pp. 4, 22, 30, and 32; and Selected pages from the *JCPenney Catalog Maternity Collection*, dated Fall/Winter 2005, front and back cover pages, and pp. 14, 15, and 28.
1 in the Oven's InvisiBelly™ Jeans, Trade Literature, Feb. 26, 2008, http://www.1intheoven.com/index.php?p=product&id=88&parent=26&is_print_version=true.
International Search Report and Written Opinion dated Aug. 18, 2008 in PCT/US2008/061739.

* cited by examiner

BELLY COVERING GARMENT

Matter enclosed in heavy brackets [ ] appears in the original patent but forms no part of this reissue specification; matter printed in italics indicates the additions made by reissue.

CROSS REFERENCE TO RELATED APPLICATION

The present application is a continuation of U.S. patent application Ser. No. 11/756,242, filed May 31, 2007 now U.S. Pat. No. 7,814,575.

FIELD OF THE INVENTION

The present invention relates to a garment worn during different stages of pregnancy and different stages of postpartum body changes.

BACKGROUND OF THE INVENTION

Garments intended to cover a wearer's body below the abdomen or belly during various stages of pregnancy have been manufactured as knits or woven fabrics. Some of the knits or woven fabric garments are constructed with an elastic belt or waist band which caused discomfort when tightened about the body. Some of the garments have stretchable fabric panels sewn into place with sewn seams. Such garments cause discomfort due to the presence of the sewn seams, urged by elastic stretching of the panels pressing against the torso. Moreover, women have complained that such garments are difficult to keep in place, as they gradually slip downward while they are being worn.

Denim jeans or trousers have been recycled by removing the waistband at the front of the jeans and replacing the same with an elastic band that cradles a growing abdomen. Alternatively, denim jeans or trousers are manufactured without a waistband at the front so that a separate band can be attached at the front.

Accordingly, a need exists for a garment that covers and fits a growing abdomen during different stages of pregnancy. Such a garment is required to stay up, and desirably would fit comfortably while being worn. Moreover, such a garment would stay up when worn over different body types.

SUMMARY OF THE INVENTION

A purpose of the invention is to provide a garment that adapts to cover and fit a growing abdomen during pregnancy, wherein the garment stays up when worn.

A garment comprises a garment upper portion and a garment lower portion. The garment upper portion has a belly panel that is expansible to cover and fit over a growing abdomen during different stages of pregnancy. The garment lower portion has a first torso encircling circumference that recedes downward to make way for expansion of the belly panel. The garment upper portion has a second torso encircling circumference to hold the garment up and in place over the torso.

An embodiment of the garment is adjustable to encircle different body types. Another embodiment of the invention provides a garment that fits comfortably while being worn.

An embodiment of the garment comprises an adjustable torso encircling circumference that is adjustable in girth to encircle different body types.

An embodiment of the upper portion of the garment comprises a seamless tubular elastic fabric to stretch elastically and fit different body types.

An embodiment of the abdomen covering area comprises an elastic fabric.

An embodiment of the abdomen covering area comprises an elastic fabric that is contractible elastically to cover an abdomen during different stages of postpartum body changes.

According to an embodiment of the invention, an expansible tubular upper portion of the garment is seamless to fit comfortably while being worn.

DETAILED DESCRIPTION OF THE INVENTION

Figure 1:
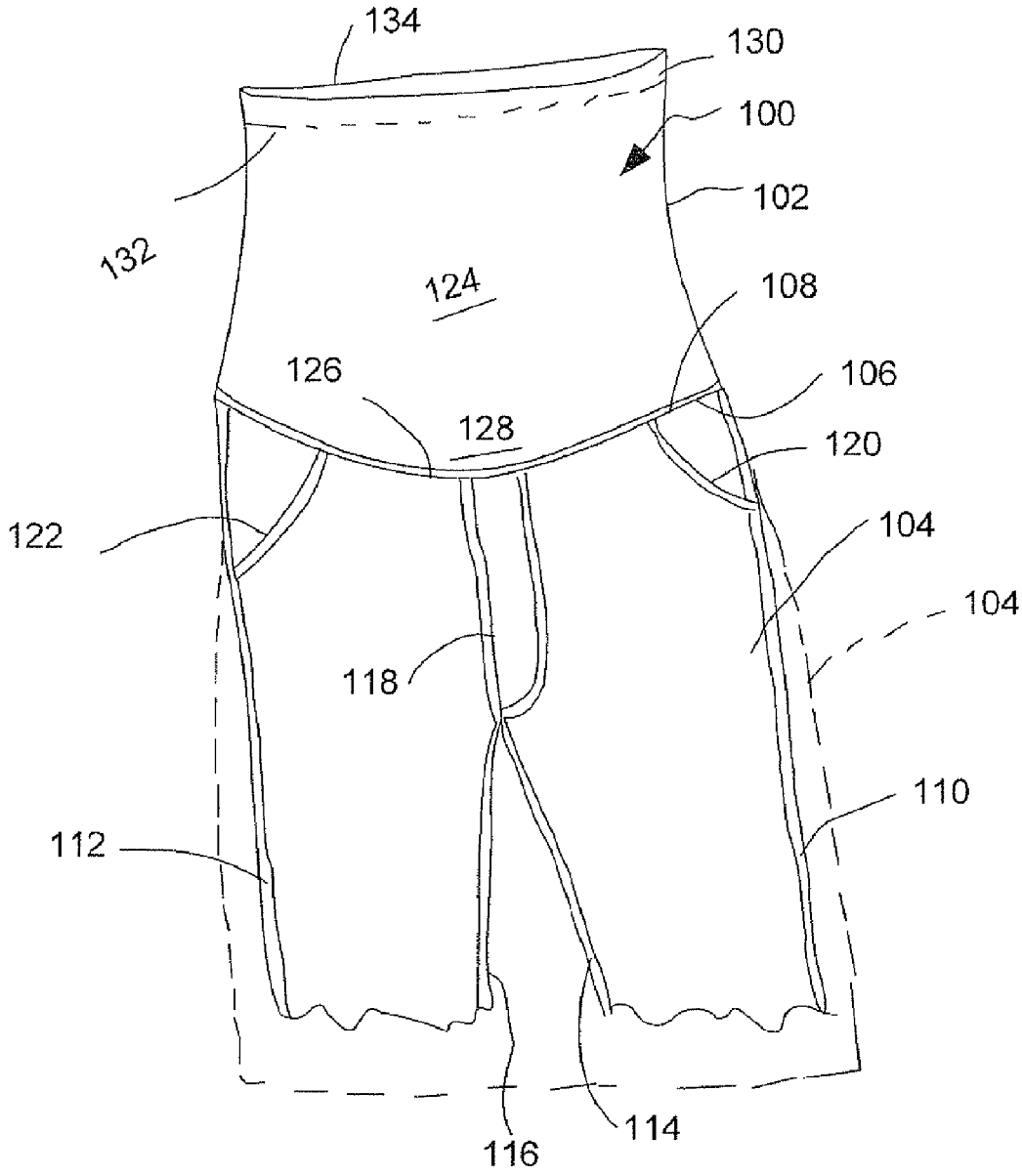
FIG. 1 is a front view of a garment according to the present invention.

FIG. 1 discloses a garment 100 for encircling a lower torso portion of a wearer of the garment 100. The garment 100 comprises a garment upper portion 102 and a garment lower portion 104. A lower end perimeter 106 of the garment upper portion 102 is attached to a corresponding upper end perimeter 108 of the garment lower portion 104. The garment lower portion 104 comprises, for example, a pair of trousers, such as, denim jeans. Alternatively, the garment lower portion 104 comprises a skirt depicted in FIG. 1 in phantom outline.

Figure 2:
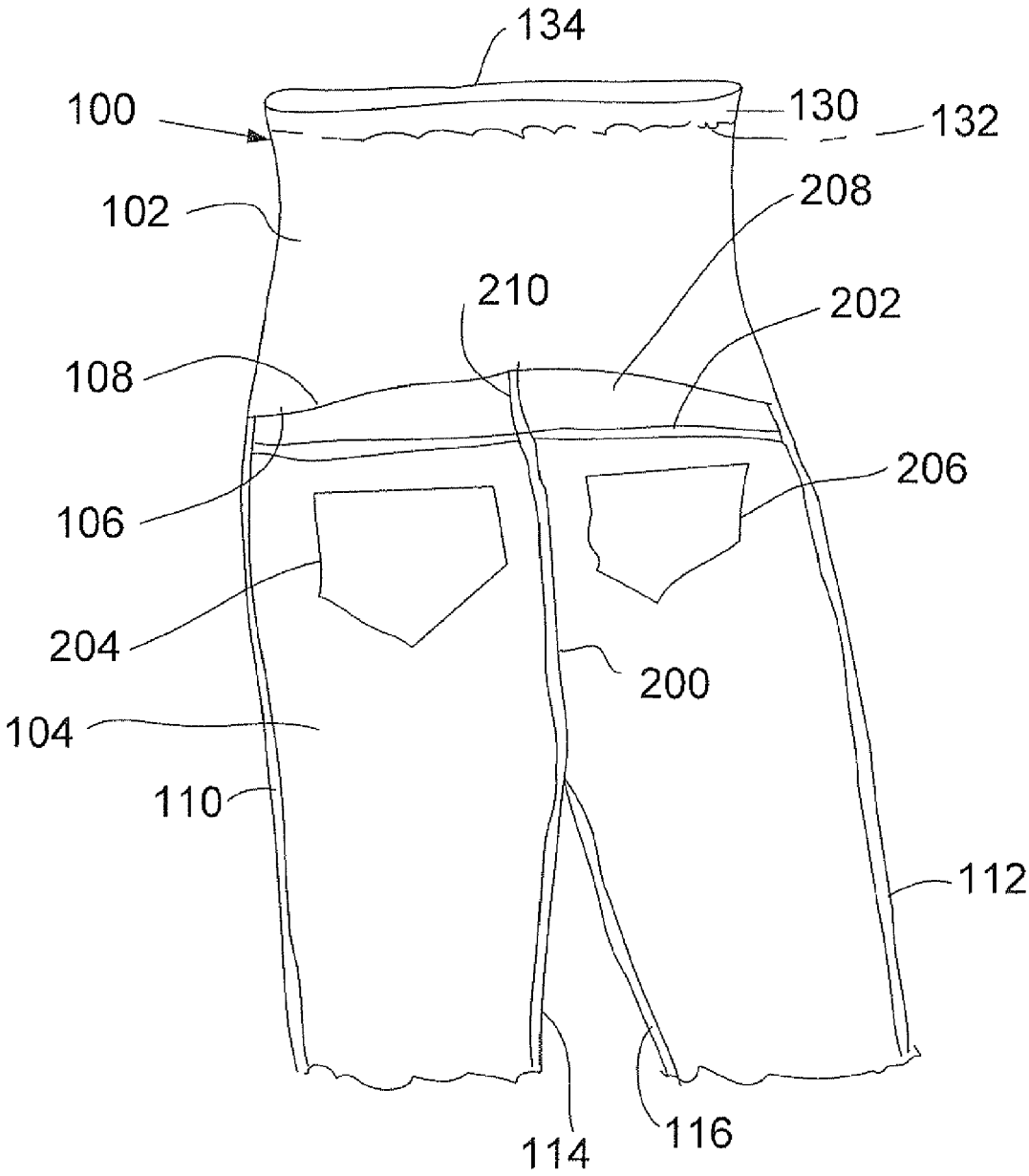
FIG. 2 is a view of a backside portion of the garment disclosed by FIG. 1.

With reference to FIGS. 1 and 2, each leg of the pair of trousers is constructed with sewn seams. Outer side seams 110, 112 extend continuously from top to bottom of the trousers, or garment lower portion 104. Further, each leg is constructed with inner side seams 114, 116 joining a front center seam 118 of the trousers and a back side, curved center seam 200, FIG. 2, of the trousers. For example, the front center seam 106 defines a sewn "zipper less" fly front. The back side of the trousers, FIG. 2, is sewn with a back side perimeter seam 202 extending horizontally across the back side of the trousers from the outer side seams 110, 112 to the back side center seam 200. If pockets are desired, the legs of the trousers are constructed, for example, with a front pockets 120, 122 and back pockets 204, 206.

FIG. 2 discloses an embodiment of the trousers, or garment lower portion 104, having a partial waistband 208 joining and extending from the side seams 110, 112 of the trousers and extending across a back side of the trousers or garment lower portion 104. The waistband 208 is sewn onto the perimeter seam 202 on the back side. The waistband 208 tapers toward the side seams 110, 112 and widens across the back side, and has a center seam 210 to shape the waistband 208 with a curvature above a wearer's pelvis, and for torso coverage especially when sitting or bending.

In FIG. 1, the garment upper portion 102 has a belly panel 124 to provide an abdomen covering area. The belly panel 124 is expansible, for example, when made of a stretchable fabric, to cover and fit over a growing abdomen during different stages of pregnancy, FIG. 1A. The belly panel 124 has a bottom portion 128 that projects downward with a parabolic shape, especially when covering a growing abdomen, FIG. 1A. The perimeter 108 of the garment lower portion 104 provides a first torso encircling circumference 126 that recedes downward with a parabolic shape adjacent to and below the bottom portion 128 of the belly panel 124 to make way for expansion of the belly panel 124 when covering a growing abdomen during various stages of pregnancy. The parabolic shape includes a shallow curvature, or, alternatively includes a more pronounced curvature. The belly panel 124 extends at least partially under the abdomen of the garment wearer to meet and join the bottom portion 128 of the belly panel 124 with the parabolic receding circumference 126 of the garment lower portion 104.

According to an embodiment of the invention, at least the belly panel 124 comprises a stretchable fabric that is woven or knitted with elastic, stretchable strands. The stretchable fabric is expansible by stretching elastically to cover and fit over the growing abdomen, FIG. 1A. Further, the stretchable fabric is contractible elastically to cover a shrinking abdomen during different stages of postpartum body changes. The belly panel 124 also has foreseeable alternative functions, for example, to cover an abdomen during different stages of torso weight gains and losses, or to fit over respective torsos of different body types.

Figure 1A:
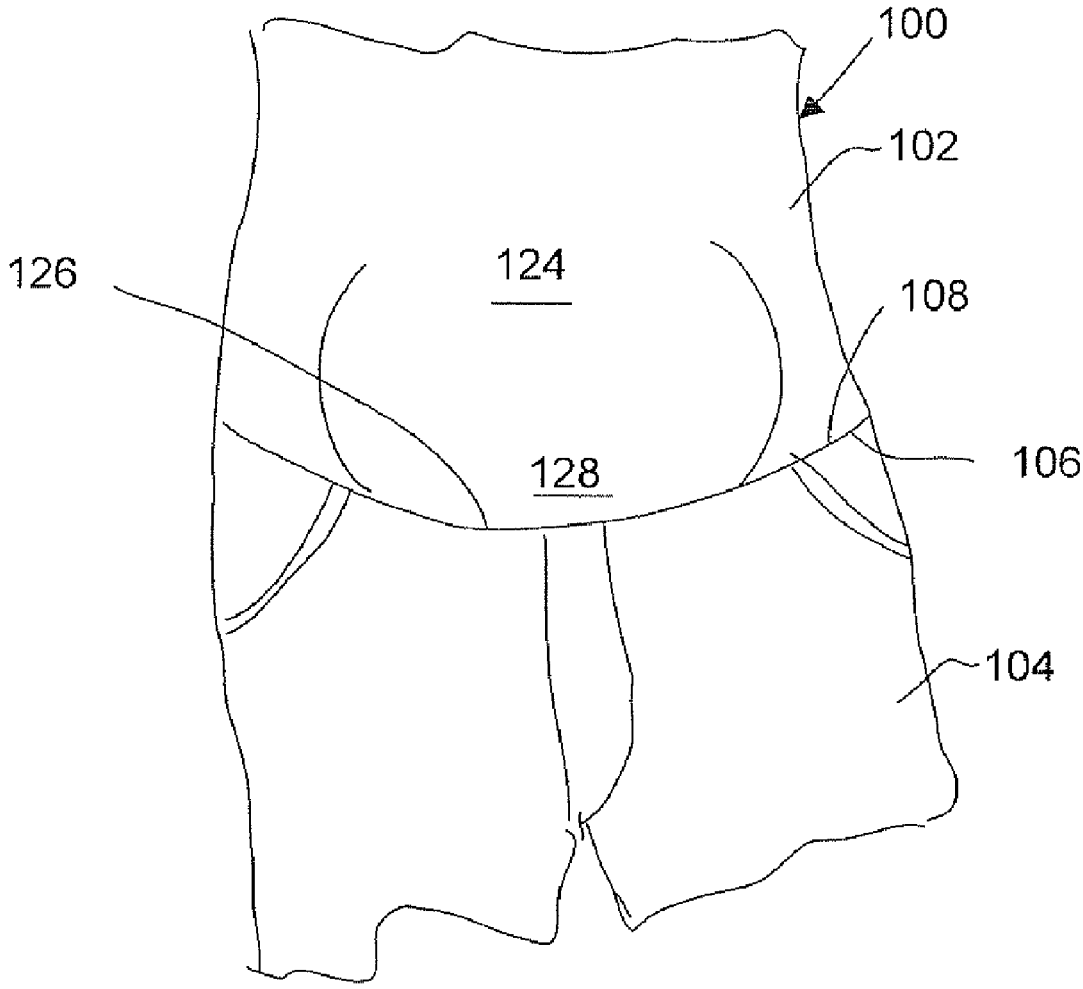
FIG. 1A is a view similar to FIG. 1, and discloses a body panel covering a growing abdomen.

In FIGS. 1 and 2, the garment upper portion has a top tubular perimeter hem 130 made by folding over a top edge margin of the stretchable fabric, and either tubular knitting or sewing the folded fabric to the inside surface of the fabric, and to create a top perimeter knitted hem stitch 132 as disclosed in FIG. 1. The perimeter of the garment upper portion 102 has a torso encircling circumference 134 to hold the garment 100 up and in place over the torso. Advantageously, the entire garment 100 is held up and in place. An embodiment of the garment upper portion 102 comprises stretchable fabric to adjust the girth of the second torso encircling circumference 134 in conformance with different body types. According to an embodiment of the invention, the torso encircling circumference 134 extends along the upper end of the belly panel 124. In FIG. 1A, the belly panel 124 extends at least somewhat above the maximum girth of the abdomen, even during a later stage of pregnancy, such that the belly panel 124 positions the torso encircling circumference 134 at least somewhat above the location of maximum girth to resist slipping down over the abdomen.

An embodiment of the garment upper portion 102 comprises a tubular structure to encircle a torso of a wearer of the garment 100. The tubular structure comprises a stretchable fabric woven or knitted with elastic, stretchable strands. The belly panel 124 comprises a portion of the stretchable fabric. The tubular structure is adaptable to cover and fit different body types by being elastically expansible and contractible. Different body types have different muscle mass distributions and spinal columns of different curvatures, which make the tubular structure conform to the different body types by expanding and contracting in different locations and amounts when worn by the different body types. The tubular structure is elastically expansible to widen the tubular girth at selected locations and amounts where needed to fit a body type, and is elastically contractible to narrow the tubular girth at selected locations and amounts where needed to fit the body type.

In FIGS. 1 and 2, the tubular structure is shaped and formed as a one-sheet hyperboloid cylinder to fit a body type having a tapered torso that tapers approximately from shoulder to waist. The perimeter profile of the one-sheet hyperboloid cylinder has hyperbolic shaped sides. Alternatively, the tubular structure is shaped and formed as a straight-sided cylinder, for example, as disclosed in FIG. 6. The perimeter profile of the straight sided cylinder has substantially straight sides.

Preferably, the stretchable fabric is woven or knitted to form a continuous, seamless tubular structure, such that the garment 100 is comfortable to wear due to the absence of seams that would tend to press against the torso.

Figure 3:
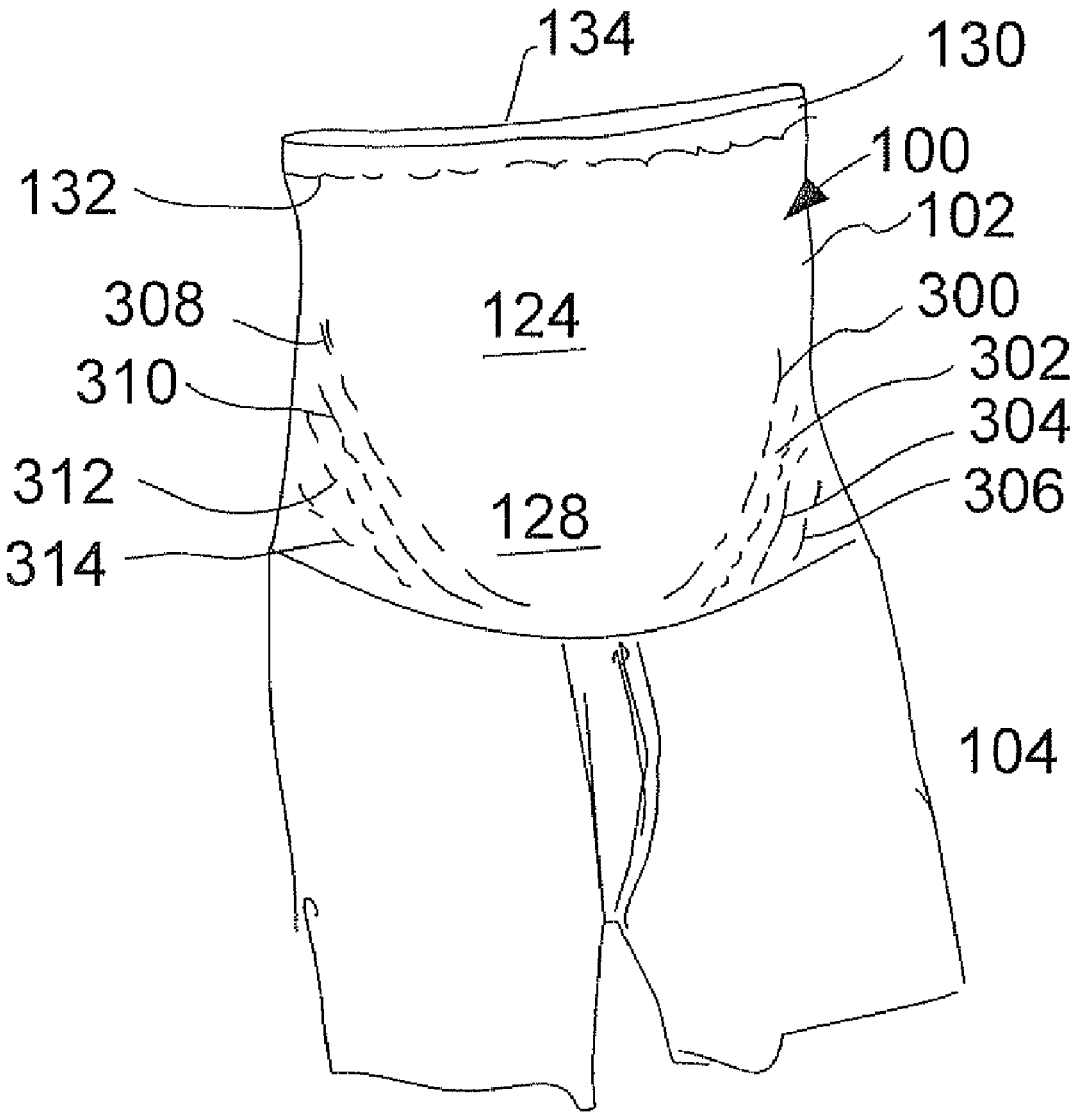
FIG. 3 is view of a front portion of another embodiment of a garment.

FIG. 3 discloses an alternative embodiment in which the garment upper portion 102 is provided with belly cradling support in the form of a series of sewn stitches or knitted tension at 300, 302, 304, 306, 308, 310, 312, and 314 in the belly panel 124. The knitted tension or stitches extend along multiple stitch paths grouped in an elliptical pattern that curves so as to cradle a curved growing abdomen, FIG. 1A, during various stages of pregnancy.

Figure 4:
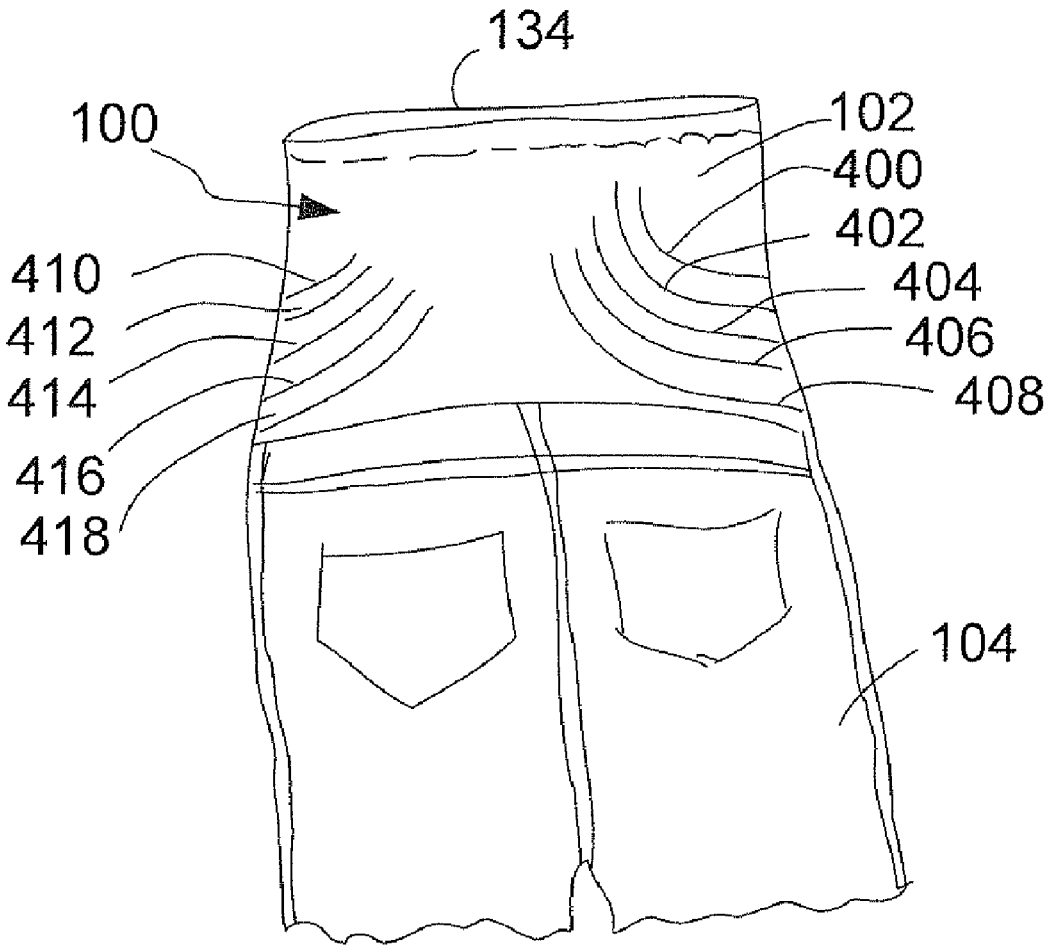
FIG. 4 is view of a backside portion of another embodiment of a garment.
Figure 5:
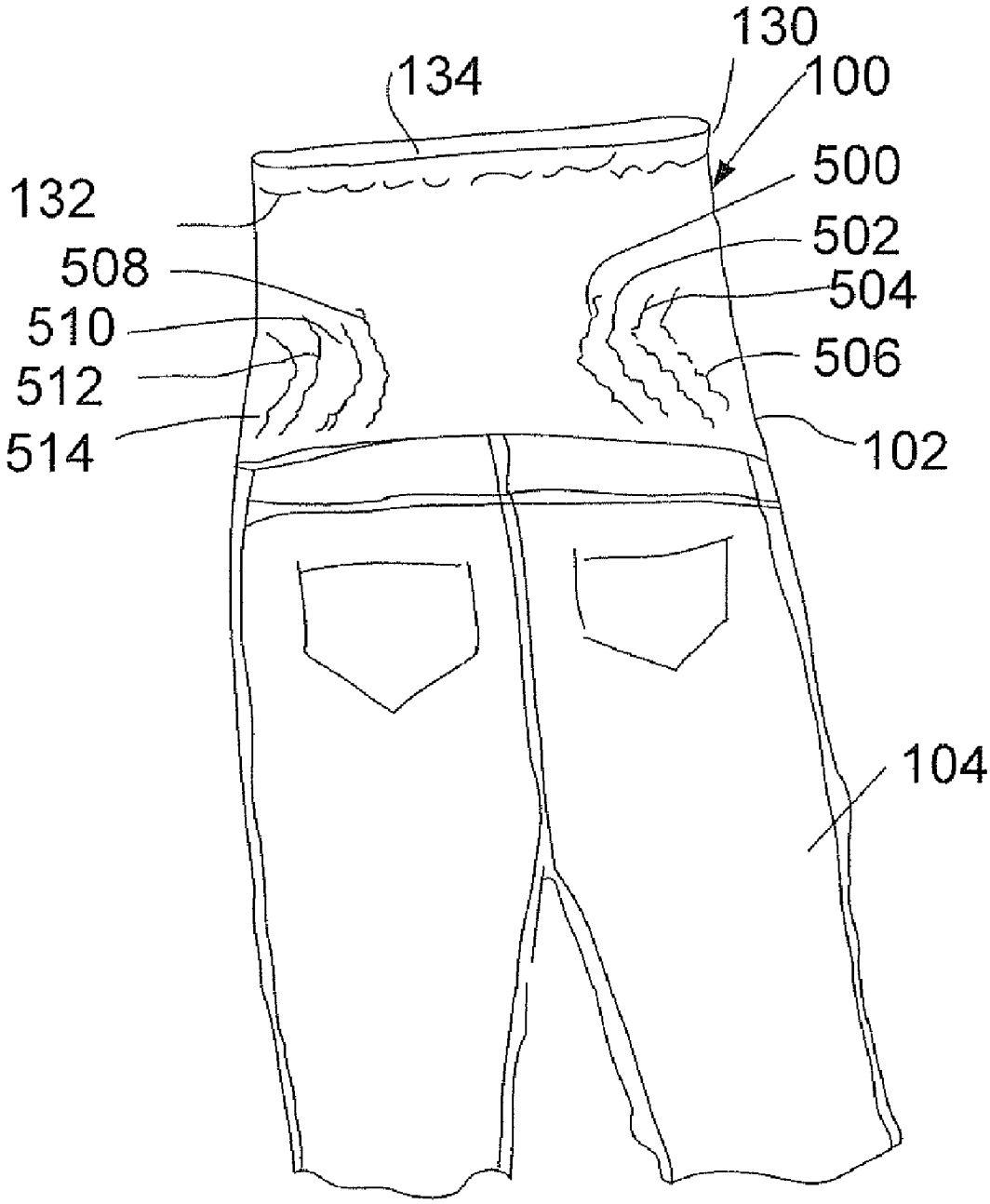
FIG. 5 is a view of a backside portion of yet another embodiment of a garment.

FIG. 4 discloses an alternative embodiment in which the backside of the garment upper portion 102 is provided with spinal column and back support for a wearer of the garment, in the form of a series of sewn supporting stitches or knitted tension at 400, 402, 404, 406, 408, 410, 412, 414, 416, 418 in the fabric, wherein the supporting knitted tension or stitches stiffen the fabric at the backside of the garment upper portion 102 to provide spinal and back support of the wearer of the garment 100. For example, the series of supporting stitches are arranged along multiple stitch paths grouped in a hyperbolic pattern or other curved pattern along an axis extending substantially vertically along a spinal supporting section of the fabric. FIG. 5 discloses an alternative pattern of supporting stitches 500, 502, 504, 506, 508, 510, 512, 514 in the fabric, wherein the supporting stitches are arranged along multiple stitch paths. For example, the stitch paths are shown as being grouped in a truncated, v-shaped pattern.

Figure 6:
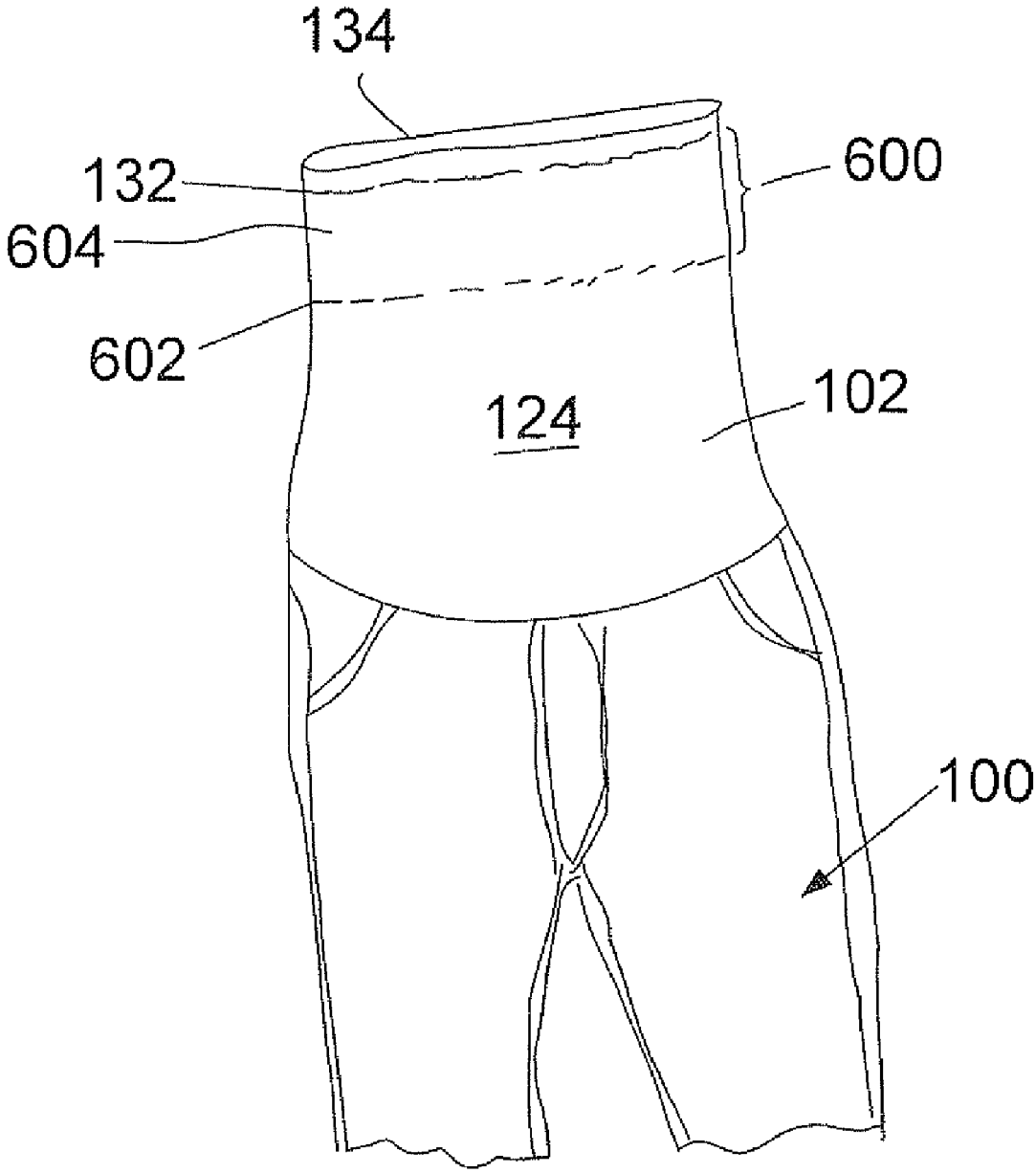
FIG. 6 is front view of a portion of another embodiment of a garment.

FIG. 6 discloses the garment upper portion 102 comprising a fabric woven or knitted to form a tubular structure, wherein the fabric of the tubular structure is doubled back on itself downward from the top circumference 134 thereof to form a double-layer tubular structure 600 that extends downward at least for a portion of the garment upper portion 102. The layers of the double-layer tubular structure 600 are sewn together with a tubular perimeter drop stitch 602. The layers are further sewn with a top, tubular perimeter hem stitch 132 as described in FIG. 1. In an alternative embodiment disclosed by FIG. 6, the fabric is doubled back over an inner tubular layer of stretchable fabric 604, shown in phantom outline by and between the stitches 132, 602, that is flatly layered and sewn in between the two tubular layers of the double layer fabric. The three tubular layers are sewn together with the top, tubular perimeter drop stitch 602 and the top, tubular perimeter hem stitch 132 as described in FIG. 1. The inner layer 604 of stretchable fabric provides the belly panel 124 with the capability for resilient expansion. In another embodiment, the double layer fabric comprises a stretch fabric woven or knitted with elastically stretchable and contractible yarns, providing the belly panel with the capability for resilient expansion.

Figure 7:
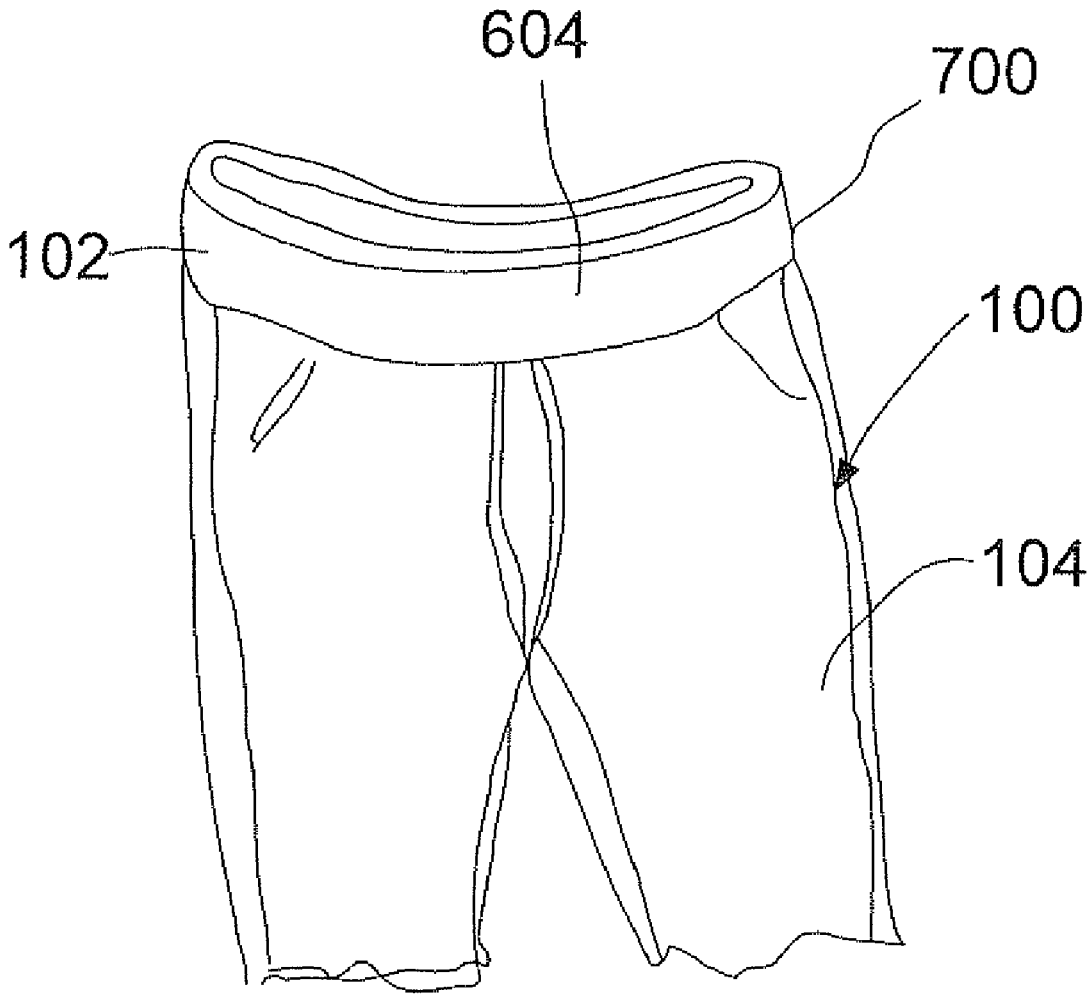
FIG. 7 is front view of a portion of yet another embodiment of a garment.

FIG. 7 discloses that the garment 100 of FIG. 6 is convertible to comprise a bottom garment without a top, the garment upper portion 102 is foldable toward the garment lower portion 104 to provide a folded band 700 on the garment lower portion 104, which is to be worn solely as a garment bottom 104 having the folded band 700, and having no top. Each of the other embodiments of the garment 100 is similarly convertible by adding the stretchable fabric 604 to the upper garment portion 102 of the other embodiment of the garment 100, and folding the garment upper portion 102 toward the garment lower portion 104 to provide a folded band 700 on the garment lower portion 104 of the other embodiment of the garment 100.

This description of the exemplary embodiments is intended to be read in connection with the accompanying drawings, which are to be considered part of the entire written description. In the description, relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A garment portion having an attached belly panel portion comprising:

an expansible belly panel adapted to substantially cover a wearer's entire belly region, said belly region comprising an area beginning just beneath the wearer's breast area and extending over the wearer's abdomen to a lower abdomen region beneath the wearer's belly, said belly panel comprising:

an upper edge portion defining a first encircling circumference about a wearer's torso that is at or above the wearer's upper abdomen region, and a lower edge portion spaced from the upper edge portion and defining a second encircling circumference about the wearer's lower abdomen region;

and a garment lower portion, in communication with the lower edge portion, having a torso encircling circumference that recedes downward to make way for expansion of the belly panel.

2. The garment portion of claim 1, further comprising a pair of trousers attached to said lower edge portion.

3. The garment portion of claim 2, wherein said trousers comprise denim jeans.

4. The garment portion of claim 3, wherein said denim jeans comprise one or more pockets and a sewn zipperless fly front.

5. The garment portion of claim 1, further comprising a skirt attached to said lower edge portion.

6. The garment portion of claim 1, wherein said belly panel is adapted to cover the wearer's belly region during different stages of weight gains and losses.

7. The garment portion of claim 1, wherein said belly panel is adapted to substantially cover and fit over different body types.

8. The garment portion of claim 1, wherein the belly panel is elastically expansible and contractible.

9. The garment portion of claim 1, wherein the belly panel is seamless to fit comfortably while being worn.

10. The garment portion of claim 1, wherein the belly panel is foldable to comprise a folded band.

11. The garment portion of claim 1, wherein the belly panel is woven or knitted with elastic, stretchable strands.

12. The garment portion of claim 1, wherein a top edge margin of the belly panel is folded over and sewn or knitted to an inside of the belly panel fabric.

13. The garment portion of claim 1, wherein the belly panel comprises a double layer tubular structure.

14. The garment portion of claim 1, wherein the belly panel further comprises a partial waistband extending across a back side of the lower edge portion and extending down into side seams of an article of clothing connected thereto.

15. The garment portion of claim 1, wherein the belly panel further comprises one or more belly-cradling stitches or knitted tension to cradle the wearer's abdomen region.

16. The garment portion of claim 1, wherein the lower edge portion is configured to extend downward with a parabolic shape to accommodate the wearer's expanding belly region.

*17. The garment portion of claim 15, wherein the stitches or knitted tension extend along multiple paths arranged in an elliptical pattern that curves, so as to cradle a curved abdomen.*

*18. The garment portion of claim 1, further comprising a series of stitches or knitted tension in a backside of the garment portion to provide spinal and back support against the wearer.*

*19. The garment portion of claim 18, wherein the series of stitches or knitted tension extends along a pattern of multiple stitch paths.*

*20. The garment portions of claim 1, wherein the belly panel defines a tubular structure that is shaped and formed as a hyperboloid cylinder to fit a body type having a tapered torso.*

*21. The garment portion of claim 1, wherein the belly panel defines a tubular structure that is shaped and formed as straight-sided cylinder to fit a body type having a correspondingly shaped torso.*

* * * * *

(12) INTER PARTES REVIEW CERTIFICATE (94th)

United States Patent
Hendrickson et al.

(10) Number: US RE43,563 K1
(45) Certificate Issued: Jul. 10, 2015

(54) BELLY COVERING GARMENT

(75) Inventors: Lisa A. Hendrickson; James H. Gardner, III; Richard Adelman

(73) Assignee: Destination Maternity Corporation

Trial Numbers:

IPR2013-00530 filed Aug. 27, 2013
IPR2013-00531 filed Aug. 27, 2013
IPR2014-00508 filed Mar. 14, 2014

Petitioner: Target Corporation

Patent Owner: Destination Maternity Corporation

Inter Partes Review Certificate for:

Patent No.: RE43,563
Issued: Aug. 7, 2012
Appl. No.: 13/161,169
Filed: Jun. 15, 2011

The results of joined IPR2013-00530, IPR2013-00531 and IPR2014-00508 are reflected in this inter partes review certificate under 35 U.S.C. 318(b).

INTER PARTES REVIEW CERTIFICATE
U.S. Patent RE43,563 K1
Trial No. IPR2013-00530
Certificate Issued Jul. 10, 2015

AS A RESULT OF THE INTER PARTES REVIEW PROCEEDING, IT HAS BEEN DETERMINED THAT:

Claims 1-4, 6-8, 10-14, 16, 20 and 21 are cancelled.

* * * * *